United States Patent
Zeng

(10) Patent No.: US 7,589,840 B2
(45) Date of Patent: Sep. 15, 2009

(54) BROAD- AND INTER-BAND MULTI-WAVELENGTH-REFERENCE METHOD AND APPARATUS FOR WAVELENGTH MEASUREMENT OR MONITORING SYSTEMS

(75) Inventor: Ke-Cai Zeng, Fremont, CA (US)

(73) Assignee: Sunrise Telecom Incorporated, San Jose, CA (US)

( * ) Notice: Subject to any disclaimer, the term of this patent is extended or adjusted under 35 U.S.C. 154(b) by 613 days.

(21) Appl. No.: 11/329,522

(22) Filed: Jan. 10, 2006

(65) Prior Publication Data

US 2007/0183781 A1 Aug. 9, 2007

(51) Int. Cl.
  *G01B 9/02* (2006.01)
(52) U.S. Cl. .................................................. 356/454
(58) Field of Classification Search ................. 356/451, 356/454, 480, 519
  See application file for complete search history.

(56) References Cited

U.S. PATENT DOCUMENTS

| | | | |
|---|---|---|---|
| 5,892,582 A | 4/1999 | Bao et al. | |
| 6,327,036 B1 | 12/2001 | Bao et al. | |
| 6,504,616 B1 | 1/2003 | Haber et al. | |
| 6,606,158 B2 | 8/2003 | Rosenfeldt et al. | |
| 6,717,967 B2 | 4/2004 | Cliche et al. | |
| 6,744,524 B1 | 6/2004 | Kogan et al. | |
| 6,795,607 B1 | 9/2004 | Archambault et al. | |
| 2002/0126348 A1 | 9/2002 | Lange et al. | |
| 2002/0131104 A1 | 9/2002 | Johnson et al. | |
| 2003/0035163 A1* | 2/2003 | Althouse et al. | 359/110 |
| 2005/0123300 A1 | 6/2005 | Kim et al. | |
| 2005/0271386 A1 | 12/2005 | Zeng et al. | |

FOREIGN PATENT DOCUMENTS

WO 03/017533 A2 2/2003

* cited by examiner

*Primary Examiner*—Hwa (Andrew) S Lee
(74) *Attorney, Agent, or Firm*—Mikio Ishimaru

(57) ABSTRACT

A wavelength measurement or monitoring system provides a tunable Fabry-Perot optical filter. At least one known light source is used to calibrate and correlate separate wavelength bands scanned by the tunable Fabry-Perot optical filter. At least one wavelength reference is utilized to calibrate at least one wavelength band of the tunable Fabry-Perot optical filter. The wavelength reference is transferred to a wavelength band that is identified for measurement when the wavelength reference is not in a wavelength band identified for measurement by the tunable Fabry-Perot optical filter. An unknown optical signal is scanned through the tunable Fabry-Perot optical filter. The wavelengths in the unknown optical signal are specified.

16 Claims, 6 Drawing Sheets

BROAD- AND INTER-BAND MULTI-WAVELENGTH-REFERENCE METHOD AND APPARATUS FOR WAVELENGTH MEASUREMENT OR MONITORING SYSTEMS

CROSS-REFERENCE TO RELATED APPLICATIONS

The present application contains subject matter related to a U.S. patent application Ser. No. 11/048,455, filed Jan. 31, 2005, and entitled "FULL-BAND OPTICAL SPECTRUM ANALYZER AND METHOD". The related application is assigned to Sunrise Telecom Incorporated. The subject matter thereof in its entirety is hereby incorporated hereinto by reference thereto.

The present application also contains subject matter related to a concurrently filed U.S. patent application Ser. No. 11/615,986 by Ke-Cai Zeng, Paul Chang, Jürgen Brendle, and Bruno Huttner, and entitled "OPTICAL SIGNAL MEASUREMENT SYSTEM". The related application is assigned to Sunrise Telecom Incorporated. The subject matter thereof in its entirety is hereby incorporated hereinto by reference thereto.

TECHNICAL FIELD

The present invention relates generally to the measurement of wavelengths of electro-magnetic emissions, and more particularly to broad range wavelength measurement or monitoring systems utilizing Fabry-Perot filters.

BACKGROUND ART

Lensed tunable Fabry-Perot ("FP") interferometers ("FPIs") have long played an important role in optical spectrum measurements in physics, chemistry, astronomy and other diverse scientific fields. Miniature lensed FPIs adapted to fiber optical systems can provide medium resolution tuning (finesse=100). Lensless fiber FPIs ("FFPIs"), however, can perform at resolutions greater than 500 for tuning functions in optical fiber systems. Such high performance tunable FFPIs have enabled interrogator systems for accurately measuring wavelength responses of passive or active fiber optics devices.

In many technical applications, precision wavelength measurements must be made in the field, oftentimes far distant and removed from precision calibration resources. It is therefore necessary to have a reliable and accurate on-site wavelength reference that can be used for any optical band that may be of interest. This is especially true for implementing the many optical instruments of contemporary dense wavelength division multiplexing ("DWDM") fiber optics networks, such as optical spectrum analyzers ("OSAs"), optical channel monitors ("OCMs"), dispersion measurement ("DM") tools, and so forth.

Unfortunately, calibration sources under field conditions often are not available for all the wavelength bands of interest at the field location. In fact, available calibration sources frequently do not even fall within the limited range of a particular band that is currently identified for measurement in the field. Also lacking, in general, are optical spectrum analyzer and reference systems that have broad wavelength ranges and that can also utilize and benefit from the particular advantages of FP interferometers.

Thus, a need still remains for systems for broad- and inter-band multi-wavelength references, and in particular for such systems that employ FP interferometers for the measurement of wavelengths of light over broad and extended wavelength ranges. A more particular need exists for accurate wavelength references that can transfer a wavelength reference that is provided by an existing wavelength reference source to a different wavelength range of interest.

In view of the ever-increasing commercial competitive pressures, increasing consumer expectations, and diminishing opportunities for meaningful product differentiation in the marketplace, it is increasingly critical that answers be found to these problems. Moreover, the ever-increasing need to save costs, improve efficiencies, and meet such competitive pressures adds even greater urgency to the critical necessity that answers be found to these problems.

Solutions to these problems have been long sought but prior developments have not taught or suggested any solutions and, thus, solutions to these problems have long eluded those skilled in the art.

DISCLOSURE OF THE INVENTION

The present invention provides a wavelength measurement or monitoring system having a tunable Fabry-Perot optical filter. At least one known light source is used to calibrate and correlate separate wavelength bands scanned by the tunable Fabry-Perot optical filter. At least one wavelength reference is utilized to calibrate at least one wavelength band of the tunable Fabry-Perot optical filter. The wavelength reference is transferred to a wavelength band that is identified for measurement when the wavelength reference is not in a wavelength band identified for measurement by the tunable Fabry-Perot optical filter. An unknown optical signal is scanned through the tunable Fabry-Perot optical filter. The wavelengths in the unknown optical signal are specified.

Certain embodiments of the invention have other aspects in addition to or in place of those mentioned above. The aspects will become apparent to those skilled in the art from a reading of the following detailed description when taken with reference to the accompanying drawings.

BEST MODE FOR CARRYING OUT THE INVENTION

Figure 1:
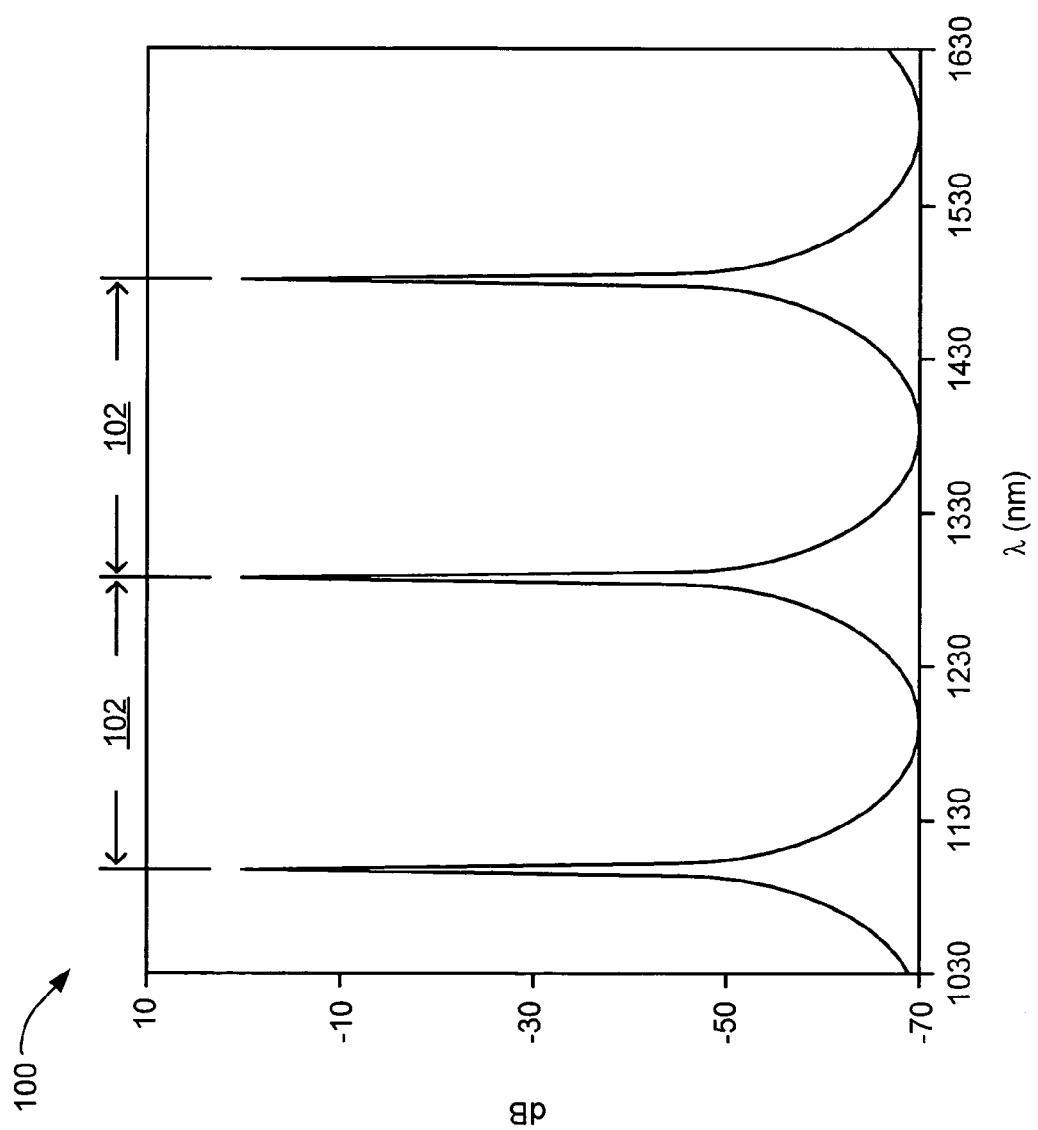
FIG. 1 is a graph of an Airy Function usable to describe the transmission profile of a Fabry-Perot filter.

In the following description, numerous specific details are given to provide a thorough understanding of the invention.

However, it will be apparent that the invention may be practiced without these specific details. In order to avoid obscuring the present invention, some well-known circuits and system configurations are not disclosed in detail. Likewise, the drawings showing embodiments of the apparatus are semi-diagrammatic and not to scale and, particularly, some of the dimensions are for the clarity of presentation and are shown exaggerated in the drawing FIGS. In addition, where multiple embodiments are disclosed and described having some features in common, for clarity and ease of illustration, description, and comprehension thereof, similar and like features one to another will ordinarily be described with like reference numerals.

It has been discovered that a Fabry-Perot ("FP") filter can be utilized to scan a broad wavelength range that is substantially larger than the FP filter's inherent free spectrum range ("FSR"), while maintaining a sufficiently narrow bandwidth ("BW") and thus maintaining excellent spectral resolution.

According to the present invention, there are disclosed devices and methods for the measurement of wavelengths of light. More particularly, accurate wavelength reference systems have been discovered and are disclosed that unexpectedly achieve significantly extended wavelength ranges by accurately transferring the wavelength reference provided by an existing wavelength reference source for one wavelength range or band to another wavelength range or band of interest. The invention relates in particular to systems that provide broad- and inter-band wavelength references for optical wavelength scanning and optical spectrum analysis devices utilizing FP interferometers ("FPIs").

In wavelength sensing applications over a wide wavelength range, the high resolution of tunable lensless fiber FPIs ("FFPIs") provides a distinct advantage and allows sensing to picometer ("pm") levels. In addition, the all-fiber FFPI is mechanically robust with a very high in-field reliability record. When appropriately temperature compensated, it operates over a very wide temperature range with minimum insertion loss and tuning voltage variation.

All-fiber FFPIs used as scanning interferometers can sense extremely small wavelength shifts when piezo-electric transducer ("PZT") actuators are used for tuning the multi-pass dual mirror optical cavity of the FFPI. However, early work using these interferometers for measuring wavelength shifts in reflected fiber Bragg gratings ("FBGs") lacked adequate wavelength references for long-term stability. The PZT actuator typically employed to tune FPIs exhibits dynamic non-linearities arising from nonlinear length dependence upon voltage, and upon voltage hysteresis with temperature. Therefore, to fully utilize a tunable FPI (whether a lensed or all-fiber FPI) as a spectrally calibrated interferometer, certain real-time multi-wavelength referencing techniques need to be implemented.

In-fiber FBGs can produce a narrow-band response around a single wavelength (by reflecting a narrow-band peak, or by transmitting the illuminating spectrum with a narrow-band notch or bole). Low finesse fixed cavity FPIs (lensed or all-fiber lensless) can be used as accurate wavelength references for the calibration of tunable FFPIs to increase both the accuracy and the long-term stability of wavelength measurements. Although FPIs produce multiple, very accurately spaced wavelengths (i.e., a comb of peaks), a consistent problem with their use as wavelength references has been the need to accurately identify a given individual peak among the multiple wavelength peaks produced. Hence, in the application of fixed-cavity FPIs as wavelength references, a means has been lacking for identifying particular teeth in the comb of the FPI output peaks.

Additionally, although existing wavelength referencing methods based on FPIs produce multiple, accurately spaced wavelengths (i.e., a comb of peaks), a problem with their use is that the wavelength range where they can provide a valid wavelength reference is limited by the bandwidth and power of the reference light source used with the interferometer. Normally, the bandwidth of such broadband light sources is typically several tens of nanometers. Therefore, the resulting wavelength reference range also extends from several tens of nanometers to perhaps a little over a hundred nanometers, depending upon the range of the band being calibrated. In many applications, such a limited reference light source range is far too limited since those applications necessitate a very wide broadband wavelength reference.

Another problem with existing wavelength referencing methods is that they require that the input signal's wavelength falls in the wavelength band of the broadband light source that is used for the calibration reference. However, there are numerous application environments where there is no such broadband light source available for the wavelength band(s) of interest in that environment. In other situations, even if a suitable broadband light source is available for the band(s) of interest, it may not be possible to use that particular broadband light source due to interference with or from the measurement environment.

Still another problem with some existing wavelength referencing methods is that there is a time interval between calibrating with the reference signal and measuring the real (target) signal due to the time required to switch from the reference calibration to the real signal measurement. Although this time interval may be short, in some applications it can still be too long to provide an accurate real-time wavelength reference. Some applications need the wavelength referencing and the real signal measurement to be performed simultaneously. Thus, there is a need as well for new and improved systems for performing wavelength referencing.

As taught and disclosed herein, a system has been discovered that provides broad- and inter-band multi-wavelength references for use in identifying and measuring wavelengths of radiation from an optical device. The system employs but a single FP interferometer and requires a single at-hand (field) calibration reference for one wavelength band and a one-time bench-top wavelength standard for other wavelength band(s) to make such broad- and inter-band multi-wavelength measurements. A current, real-time wavelength calibration setup in one range and one or more pre-calibrated (pre-existing) wavelength reference setups for other wavelength ranges enable the wavelength reference information provided by a current wavelength reference setup to be transferred to other wavelength ranges, while not requiring separate FP interferometers for those other ranges.

In one embodiment, the current wavelength reference may be, for example, for the 1460 nm to 1650 nm wavelength range. The system of the present invention then unexpectedly provides for readily transferring and extending the wavelength reference to other wavelength ranges such as, for example, to the 1270 nm to 1460 nm wavelength range.

With respect to the single FPI that is employed for the full broad- and inter-band multi-wavelength measurements, it has been discovered that a full band optical spectrum analyzer ("OSA") with a wavelength scanning range of 380 nm or more can be implemented utilizing a single tunable FP filter. In one embodiment, the FP filter has a FSR of about 180 nm and a 3-dB BW less than 80 pm between 1460 nm and 1650 nm. In another wavelength region, from about 1260 nm to 1470 nm, the FSR is slightly smaller. Well-defined band pass filters ("BPFs") are then used to enable multiple optical orders of the FP filter to scan a very broad wavelength range, e.g., from 1260 nm to 1640 nm, which covers the full telecommunication wavelength bands, e.g. the O, E, S, C, and L bands. Depending upon the isolation of the BPFs, optical signal isolation between different bands can be greater than 45 dB. The FP filter-based OSA in this embodiment then has a wavelength scanning range much greater than the FP filter's FSR.

Referring now to FIG. 1, therein is shown a graph 100 of an Airy Function A(λ) that can be used to describe the transmission profile of a FP filter:

$$A(\lambda) = \frac{I_0}{1 + \left(\frac{2F}{\pi}\sin\frac{2\pi n L}{\lambda}\right)^2}, \quad (1)$$

where: $I_0$ is the peak transmission optical intensity,
F is the finesse of the FP filter, and
λ is the wavelength of the light wave.

The following equation establishes the resonant frequencies $f_m$ of the FPI utilizing the FP filter:

$$f_m = \frac{c}{2Ln}m \quad (2)$$

The mode spacing is defined as the FSR 102 of the FPI. In terms of the frequency f of the light wave, its FSR 102 is:

$$FSR(f) = \frac{c}{2Ln} \quad (3)$$

The BW of the FPI is defined as the full width at half maximum ("FWHM"). It is defined by the following equation (Hz):

$$BW = \frac{1-r}{\sqrt{r}} \frac{c}{2\pi n L} \quad (4)$$

where: r is the reflectivity of the filter mirrors,
c the speed of light in a vacuum,
n the index of refraction of the media inside the filter cavity, and
L the length of the filter's cavity.

Relating the BW to the mode spacing, e.g. the FSR 102, yields the finesse F:

$$F = \frac{FSR}{BW} = \frac{\pi\sqrt{r}}{1-r} \quad (5)$$

Figure 2:
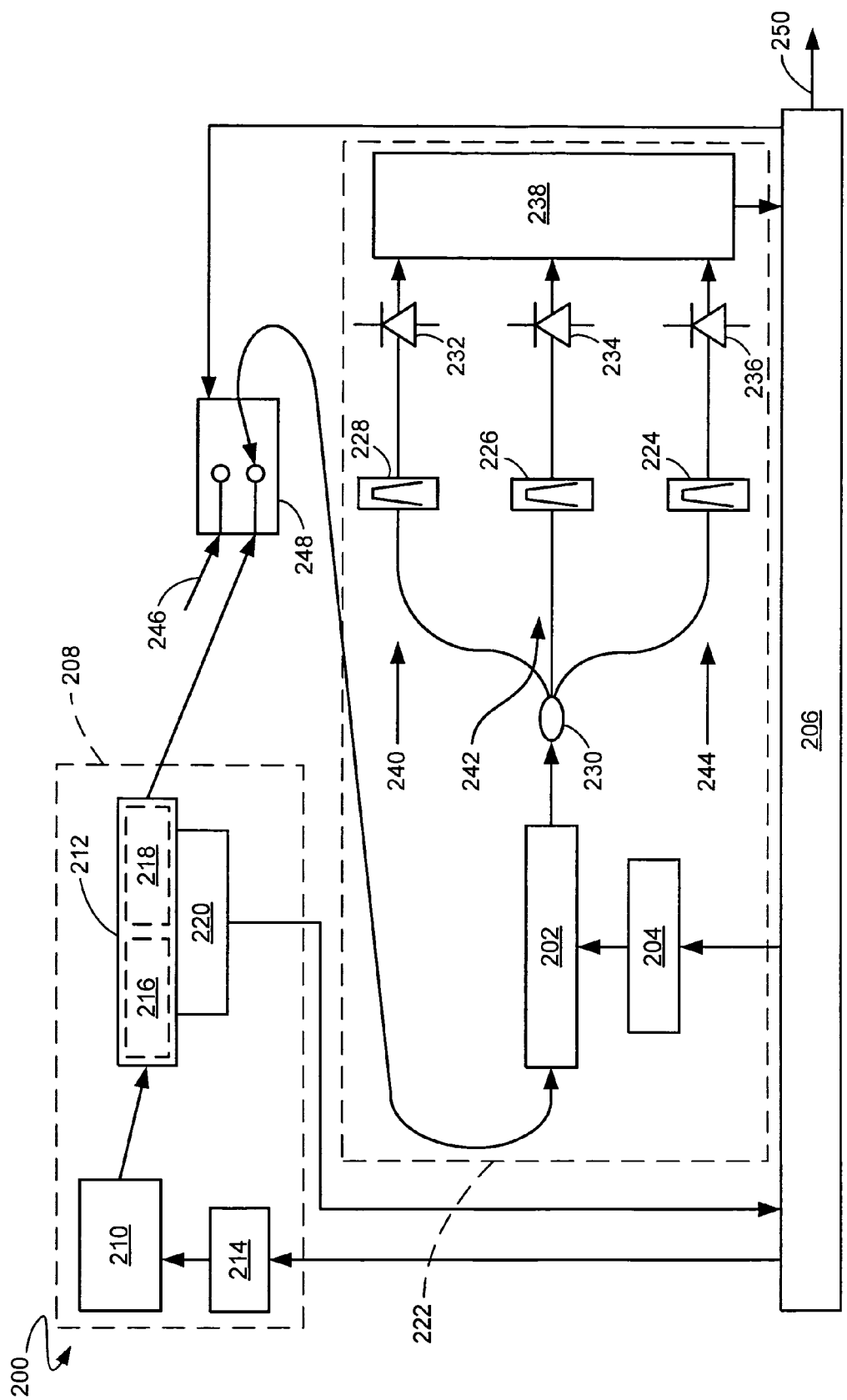
FIG. 2 is an optical circuit schematic diagram of a full band optical spectrum analyzer where an embodiment of the present invention is utilized and demonstrated.

Referring now to FIG. 2, therein is shown an optical circuit schematic diagram of a full band OSA 200, where an embodiment of the present invention is implemented, and a tunable optical filter such as a TFPF 202 is employed. The cavity length of the TFPF 202 used in the full band OSA 200 is driven conventionally by a piezoelectric transducer (not shown), which is controlled through a suitable digital-to-analog converter ("DAC") circuit 204 by a controller/analyzer 206.

The full band OSA 200 contains a wavelength reference arm 208 that has a light source 210 and a filter 212 defined therein. The light source 210 is a broad band LED, for example centered around 1550 nm, controlled by the controller/analyzer 206 through a driver 214. The filter 212 includes a fixed cavity length FPI 216, which has a FSR of about 100 GHz (800 pm) and a BW of about 80 pm. The fixed cavity length FPI 216 is combined with a FBG 218 with a 1 nm BW to block one of its resonant peaks around 1550 nm. The wavelength reference arm 208 with the fixed cavity length FPI 216 and the FBG 218 thus constitutes a wavelength reference system with picometer accuracy. A thermistor 220 provides temperature calibration information about the filter 212 to the controller/analyzer 206.

As indicated, the fixed cavity length FPI 216 is a fixed cavity length FPI with a fixed FSR of, for example, 100 GHz. The FBG 218 has a BW slightly larger than that of the resonant peaks of the fixed cavity length FPI 216. The FBG 218 has a notching position that is pre-defined to block one of the resonant peaks of the fixed cavity length FPI 216. This combination of the LED light source 210, the fixed cavity length FPI 216, and the FBG 218 is then able to provide a precise wavelength reference with accuracy that is less than one pm for the wavelength range between 1460 to 1650 nm.

The full band OSA 200 also contains a light detection arm 222 that has the TFPF 202 and the DAC circuit 204 defined therein. In addition, the light detection arm 222 has BPFs 224, 226, and 228, a three-way splitter 230, detectors 232, 234, and 236, and circuitry such as an analog-to-digital converter ("ADC") 238 defined therein. The BPF 228 and the detector 232 define a first detection channel 240, for example, for the O telecom band. The BPF 226 and the detector 234 define a second detection channel 242, for example, for the E telecom band. The BPF 224 and the detector 236 define a third detection channel 244, for example, for the S, C, and L ("S-C-L") telecom bands.

The outputs of the first, second, and third detection channels 240, 242, and 244 are respectively connected to the ADC 238, which processes the outputs into digital form and forwards the respective data to the controller/analyzer 206. The light detection arm 222 is thus configured for scanning across a wavelength range that is larger than the FSR 102 of the TFPF 202, and the detection channels 240, 242, and 244 are configured for simultaneously and individually detecting separate multiple optical orders of the wavelengths scanned and filtered by the TFPF 202.

An unknown optical signal, such as a wavelength-division-multiplexing ("WDM") signal, is provided on an input 246 for the full band OSA 200, the input 246 being connected to an optical switch 248. Before the full band OSA 200 scans the unknown WDM signal from the input 246, the optical switch 248 is set to the wavelength reference arm 208 that is configured to provide wavelength reference and calibration information to the TFPF 202. The wavelength reference and calibration information is then scanned and the results saved in the controller/analyzer 206.

The optical switch 248 is then set to connect to the unknown WDM signal on the input 246 and a scan is again taken, this time on the unknown WDM signal from the input 246, with the TFPF 202 filtering the unknown optical signal therethrough. The resulting outputs from the first, second, and third detection channels 240, 242, and 244 are then analyzed as described below to provide the full band spectrum analysis, on an output 250, of the unknown WDM signal from the input 246.

To detect the three telecom bands as described, the BPFs 224, 226, and 228 in one embodiment have the following values:

BPF 224: pass from ~1457 nm to ~1650 nm, blocking other wavelengths;

BPF 226: pass from ~1345 nm to ~1490 nm, blocking other wavelengths;

BPF 228: pass from ~1260 nm to ~1378 nm, blocking other wavelengths.

This produces and defines a wavelength detection range of 1260 nm to 1378 nm for the first detection channel 240, a wavelength detection range of 1345 nm to 1490 nm for the second detection channel 242, and a wavelength detection range of 1457 nm to 1650 nm for the third detection channel 244.

The passing bands of pairs of adjacent BPFs thus have some overlap, for example an overlap of 10 nm to 30 nm wide. However, while this overlap has been discovered to be beneficial, the overlap should not be so wide that signals from different optical orders are not distinguished.

As an example of application in a full band OSA, the present invention provides an accurate and robust broad- and inter-band multi-wavelength interferometer-based reference for use in wavelength detection and measurement. The invention is particularly advantageous because the very broad and very accurate wavelength references it confers can be based upon any single field calibration reference anywhere within the range of the wavelength measurement system of the invention, and because the reference system of the invention requires only a single FP filter for the entire range of the system.

The wavelength measurement system of the present invention (for example, the wavelength measurement system 310, FIG. 3) employs a two-part calibration procedure. The first calibration procedure is performed in a laboratory (or similar venue) where appropriate, known, and ordinarily tunable broadband calibration light resources (e.g., the first and second lasers 302 and 304, FIG. 3) are available. The procedure creates one-to-one correlations between the DAC circuit 204 (FIG. 2) values and the corresponding wavelength values for each of the several optical orders of the FPI (e.g., the TFPF 202 in the OSA 200, FIG. 2) that are being simultaneously detected. These correlations, which calibrate and directly relate the separate multiple optical orders of the wavelengths scanned by the tunable optical filter, can be utilized reliably over long periods of time and under varying use and field conditions (e.g., varying temperatures, power supply voltages, etc.). Further, the precision of these intra-and inter-band calibrations and correlations means that the separate multiple optical orders of the wavelengths scanned by the tunable optical filter have the characteristics of having been calibrated and correlated by known light sources.

In one embodiment, the correlations are captured in a cross-reference table that is stored in the wavelength measurement system. Then, by later referencing this table, it is possible to determine, for any given DAC value, what the detected wavelength will be, for example, in the first detection channel 240 (FIG. 2), what the detected wavelength will be in the second detection channel 242 (FIG. 2), and what the detected wavelength will be in the third detection channel 244 (FIG. 2). Similarly, by knowing what the detected wavelength is in one of the detection channels, the table will reveal the corresponding DAC value and the corresponding wavelengths that will be detected in the other detection channels for that DAC value or setting. In one embodiment, this correlation cross-reference table is called the "calibration-mapping table". (See the calibration-mapping table 322 in FIG. 3.)

The second calibration procedure creates an adjustment for the calibration-mapping table for the particular operational and environmental conditions currently at hand. In a field situation, for example, temperature differences, voltage differences, humidity differences, etc., that are different from those present during the original calibration, need to be accommodated. It is noteworthy, and an unexpected and important discovery of the present invention, that the relative wavelength values in the calibration-mapping table remain stable with respect to each other and retain their one-to-one correlations under such field conditions. For example, if the DAC value for a wavelength in the first detection channel 240 drifted by a certain amount due to an environmental change, that for the corresponding wavelength in the other two detection channels would drift by the same amount to the first order. Together with the mapping table, this information is very necessary in order to maintain a similar wavelength accuracy for the other wavelength bands, which was not covered by the on-site existing wavelength reference, for example the one for the 1460 nm to 1650 nm range in this case.

Field conditions may create DAC offsets, however, such that the DAC values will then correspond to different sets of corresponding wavelengths. Accordingly, a field calibration is performed just before the wavelength measurement system is to be used. It has been unexpectedly discovered that the field calibration can be reliably performed with whatever calibration reference sources may be available at that time, even if limited to only a narrow wavelength range or, in the extreme, to just a single calibration reference line, as long as the field calibration reference light source falls within the range of the wavelength measurement system.

Thus, using the available field calibration reference source, the current, real-time relationships between the DAC points and the available source reference wavelengths are then established and, in one embodiment, saved into a second table. The values in the second table establish the correlations and cross-references between the original calibration-mapping table and the current actual field DAC and related field wavelength values of the wavelength measurement system. It will be clear, of course, that the broader the available calibration reference source, the more accurate will be the correlations that are provided by the second table. In one embodiment, this second, correlation cross-reference table is called the "dynamic mapping table". (See the dynamic mapping table 324 in FIG. 3.)

Finally, in one embodiment, adjustments or offsets for the DAC values may then be calculated and generated for every wavelength in the detection channel (e.g., the first, second, or third detection channel 240, 242, or 244) into which the field calibration light source reference wavelengths fall. In one embodiment, this third table of offsets is called the "dynamic offset table". (See the dynamic offset table 326 in FIG. 3.)

To perform a scan on an unknown wavelength, the DAC value obtained for the detected (unknown) wavelength is then adjusted according to the values in the dynamic offset table, yielding highly accurate measurements of the wavelengths being scanned. This adjustment and offset process is performed regardless of the detection channel in which the detected wavelength is found, since it has been discovered that the offset values are valid for all the detection channels and wavelength bands of the wavelength measurement system. Notably, therefore, the result is that the calibration from the field calibration reference source has been transferred accurately to all the bands and detection channels of the wavelength measurement system. Noteworthy and significant as well is that the extended operational range and the high accuracy of the present invention are provided utilizing but a single FPI with no loss or compromise in the precision and performance thereof.

Figure 3:
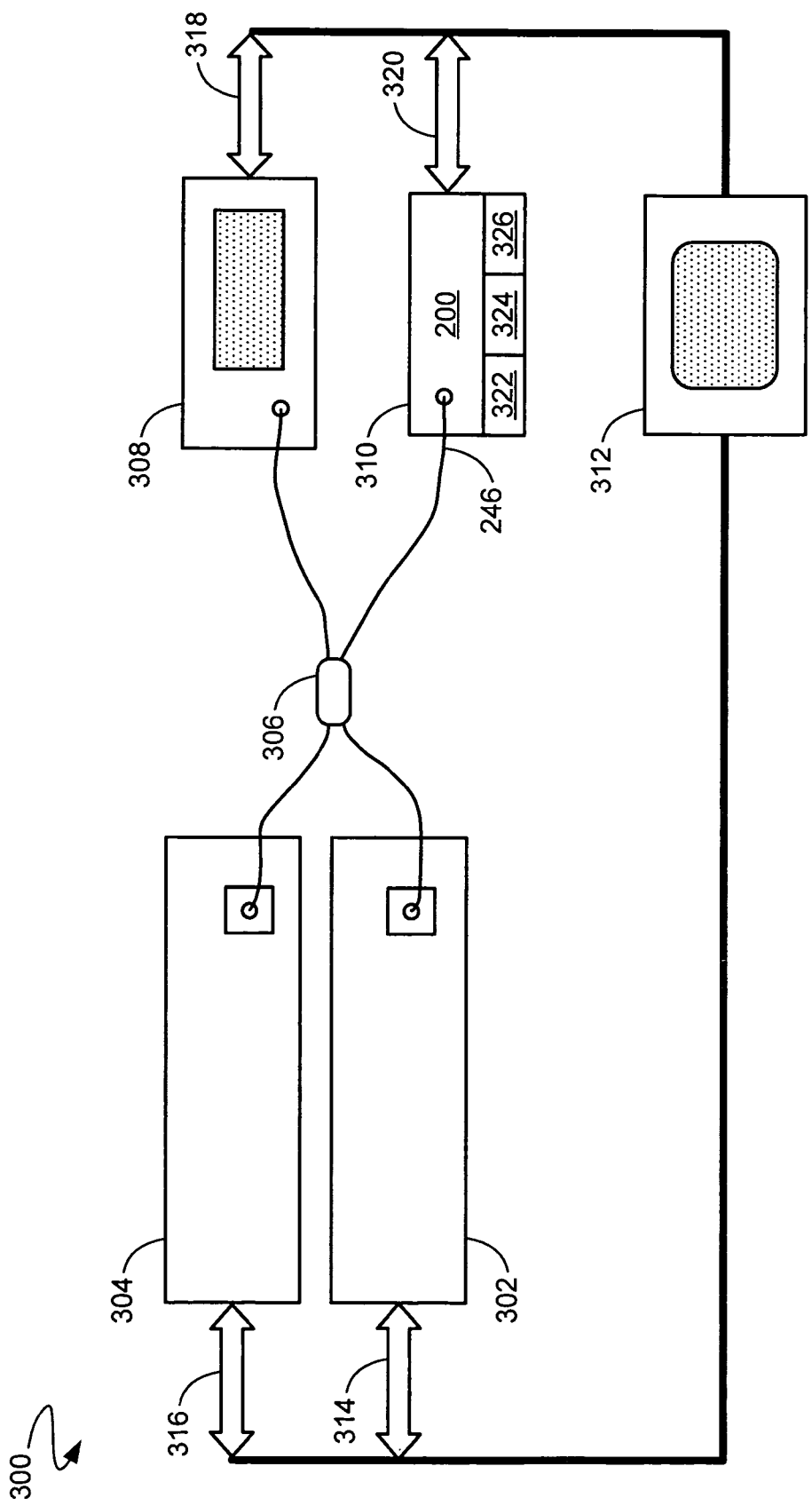
FIG. 3 is an optical circuit schematic diagram of a calibration setup for the wavelength measurement system.

Referring now to FIG. 3, therein is shown an optical circuit schematic diagram of a one time bench-top calibration setup 300. In order to illustrate the versatility of the present invention, the calibration setup 300 is described using different detection channel and band wavelength values than those discussed above. Illustrated will be the accurate measurement of an unknown wavelength signal in the O and E band when no field calibration source is available in that band, but is available instead only for the 1460 nm to 1650 nm wavelength region.

The calibration setup 300 includes a first laser 302, a second laser 304, a 2×2 coupler 306, a wavelength meter 308, a wavelength measurement system 310 according to an embodiment of the present invention, and a processor or computer 312. The first and second lasers 302 and 304 are known, tunable light sources. The outputs of the first and second lasers 302 and 304 are coupled through the 2×2 coupler 306 to the wavelength meter 308 (for accurately monitoring the first and second lasers 302 and 304) and to the wavelength measurement system 310. IEEE 488 general purpose interface busses ("GPIBs") 314, 316, and 318, and an Ethernet bus 320 respectively link the first and second lasers 302 and 304, the wavelength meter 308, and the wavelength measurement system 310 to the computer 312, which can be programmed to control the calibration operation, as well as to record measurement data from the wavelength measurement system 310 (which will itself usually also record measurement data). The wavelength measurement system 310 includes an on-site wavelength reference and multiple light detection channels (as shown in FIG. 2), a calibration-mapping table 322, a dynamic mapping table 324, and a dynamic offset table 326.

In this example, for the initial (e.g., laboratory) calibration, the first laser 302 is set at 1270 nm in the O and E band, and the second laser 304 is correspondingly set at 1460 nm in the S, C, and L band. These settings are calibrated using the wavelength meter 308. The outputs of the first and second lasers 302 and 304 are then coupled together by the 2×2 coupler 306 and sent into the wavelength measurement system 310. A scan is then performed by the wavelength measurement system 310, and the corresponding points of the DAC circuit 204 (FIG. 2) for the laser lines of the first and second lasers 302 and 304 are respectively recorded by the detector 232 (FIG. 2) for the O band and the detector 236 (FIG. 2) for the S-C-L band, and stored in the calibration-mapping table 322.

The initial calibration is continued by setting the first laser 302 at 1274 nm in the O and E band, the second laser 304 at 1464 nm in the S, C, and L band, and coupling their outputs together through the 2×2 coupler 306 and sending them into the wavelength measurement system 310. (Again, these settings are calibrated using the wavelength meter 308.) A scan is again performed by the wavelength measurement system 310, and the corresponding points of the DAC circuit 204 for the laser lines of the first and second lasers 302 and 304 are respectively recorded by the detector 232 for the O band and the detector 236 for the S-C-L band, and stored in the calibration-mapping table 322.

The process continues with the lasers 302 and 304 being incremented in this manner until the first laser 302 has swept from 1270 nm to 1460 nm and the second laser 304 has simultaneously swept from 1460 nm to 1650 nm. This yields an instant one-to-one relationship between a wavelength in the O and E band region and another wavelength in the S-C-L band region, which is established and saved into the calibration-mapping table 322.

Based upon this disclosure, it will now be clear to one of ordinary skill in the art that after the calibration-mapping table 322 is established, it is then possible to transfer a wavelength reference from one band to another. Thus, for example, a wavelength reference that falls within and is supplied for the 1460 nm to 1650 nm wavelength band can be logically correlated with (i.e., mapped into) and thereby transferred to and serve equally well as an accurate wavelength reference for the 1270 nm to 1460 nm wavelength band. The wavelength reference for the 1460 nm to 1650 nm wavelength band is thus effectively transferred by the present invention to the 1270 nm to 1460 nm wavelength band by virtue of the one-to-one relationships between the respective wavelengths in the respective bands at each corresponding point of the DAC circuit 204.

Addressing this example in greater detail, one or more unknown signals in the O and E band region are input (as described below with respect to FIG. 4) into the wavelength measurement system 310 through the input 246. Then, to perform any real-time measurements of these unknown signals, the existing or available S-C-L band wavelength reference light spectrum is first scanned for the S-C-L band region. An instant relationship between the DAC circuit 204 points and the wavelengths for the S-C-L band, such as 1460 nm, 1464 nm, and 1650 nm, etc., is established and saved into the dynamic mapping table 324. Then, the DAC circuit 204 reading differences between the calibration-mapping table 322 and the dynamic mapping table 324 are calculated for every wavelength in the S-C-L band and saved into the dynamic offset table 326.

Then a scan, through the TFPF 202, is performed for the unknown signal(s) from the input 246, in the O and E band region, and corresponding DAC circuit 204 readings are obtained. After deducting the corresponding drifting points as described by the dynamic offset table 326, the exact wavelength position corresponding to each measured DAC circuit 204 value is deduced through the calibration-mapping table 322, thereby specifying the exact wavelengths in the unknown signal.

Thus, the wavelength measurement system 310 of the present invention utilizes at least one field-available wavelength reference and calibration source, that may not be in a wavelength band that is identified for measurement, to calibrate at least one wavelength band of the TFPF 202 of the full band OSA 200 prior to measuring a light source in a wavelength band that is identified for measurement. Then, when the field reference and calibration source is not in a wavelength band that is identified for measurement, the wavelength measurement system 310 transfers the wavelength reference to the wavelength band that is identified for measurement.

From the above, it will be clear that the wavelength measurement system 310 includes circuitry for performing and controlling the many functions and operations thereof. This circuitry includes principally the controller/analyzer 206 (FIG. 2), along with the various other circuit elements of the wavelength measurement system 310 such as, for example, the ADC 238 (FIG. 2), the calibration-mapping table 322, the dynamic mapping table 324, the dynamic offset table 326, and the other operationally related elements as described above. These circuit elements will be employed as needed according to the operational conditions that are encountered. In some cases, such as when it is needed to transfer a wavelength reference from one wavelength band to another, these circuit elements may all be engaged. In other cases, fewer of the circuit elements will be employed. Since, in one embodiment, all of these functions can be under the overall control of the controller/analyzer 206, it can be said that the controller/analyzer 206 provides and incorporates: i) control circuitry for utilizing at least one wavelength reference to calibrate at least one wavelength band of the tunable optical filter; ii) circuitry for transferring the wavelength reference to a wavelength band that is identified for measurement when the wavelength reference is not in a wavelength band identified for measurement by the tunable optical filter; iii) circuitry for controlling scanning of an unknown optical signal through the tunable optical filter; and iv) circuitry for specifying the wavelengths in the unknown optical signal.

Figure 4:
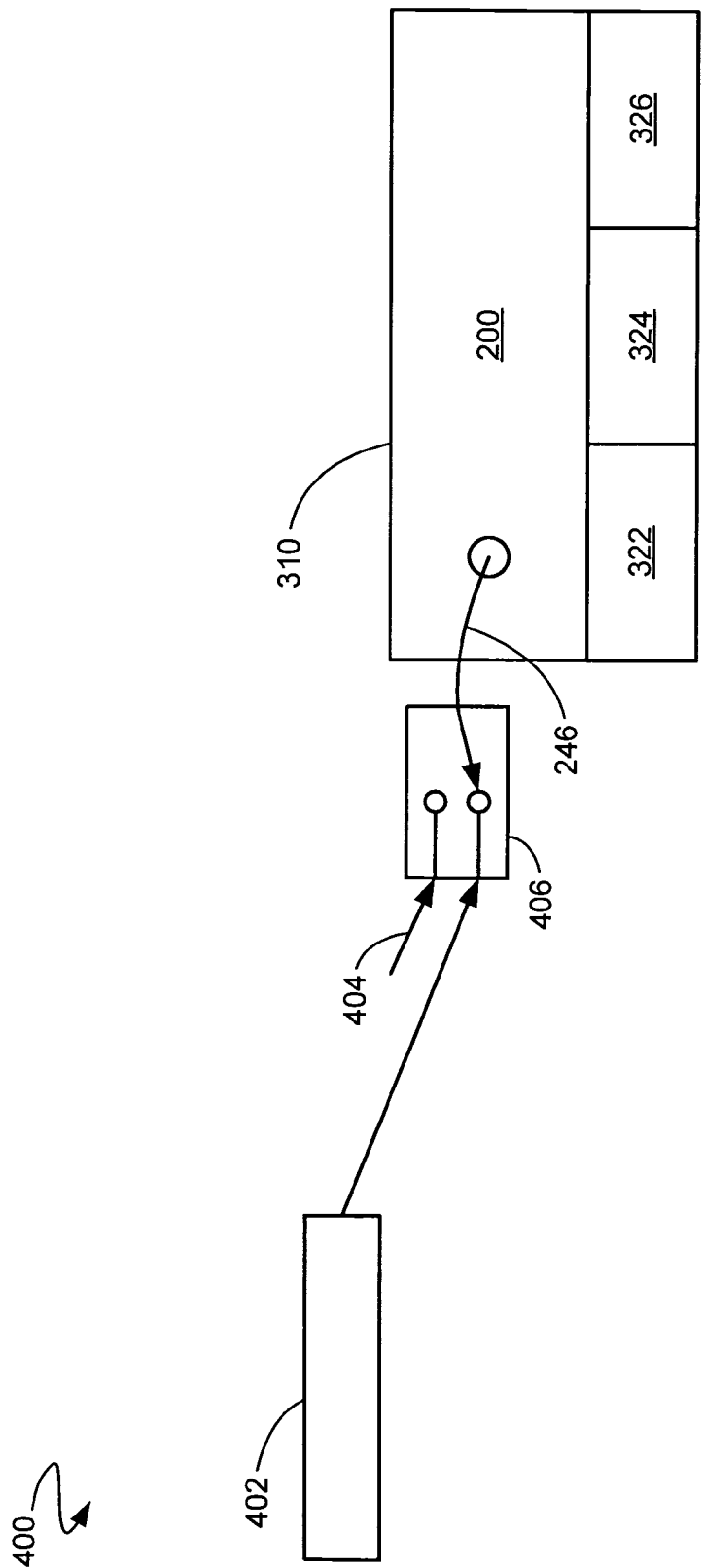
FIG. 4 is a schematic diagram depicting the wavelength measurement system employed in a remote or "field" location.

Referring now to FIG. 4, therein is shown a schematic diagram 400 of the wavelength measurement system 310 employed in a remote or "field" location, distant and removed from precision calibration resources such as the first and second lasers 302 and 304 (FHG. 3). Instead, a local calibration reference 402 is available and utilized for calibrating the wavelength measurement system 310 prior to measuring and/or analyzing an unknown signal 404.

In operation, an optical switch 406 then initially passes the optical signal from the local calibration reference 402 to the wavelength measurement system 310, where the calibration for local conditions is performed as described above (i.e., the populating of the dynamic mapping table 324 and the dynamic offset table 326). The optical switch 406 is then set to pass the unknown signal 404 through the input 246 to the wavelength measurement system 310 for analysis, again as described above, and without requiring that the local calibration reference 402 and the unknown signal 404 be in the same wavelength band. Advantageously, as described above, when the signals are not in the same band, the present invention accurately transfers the local calibration reference 402 to the wavelength band of the unknown signal 404.

Figure 5:
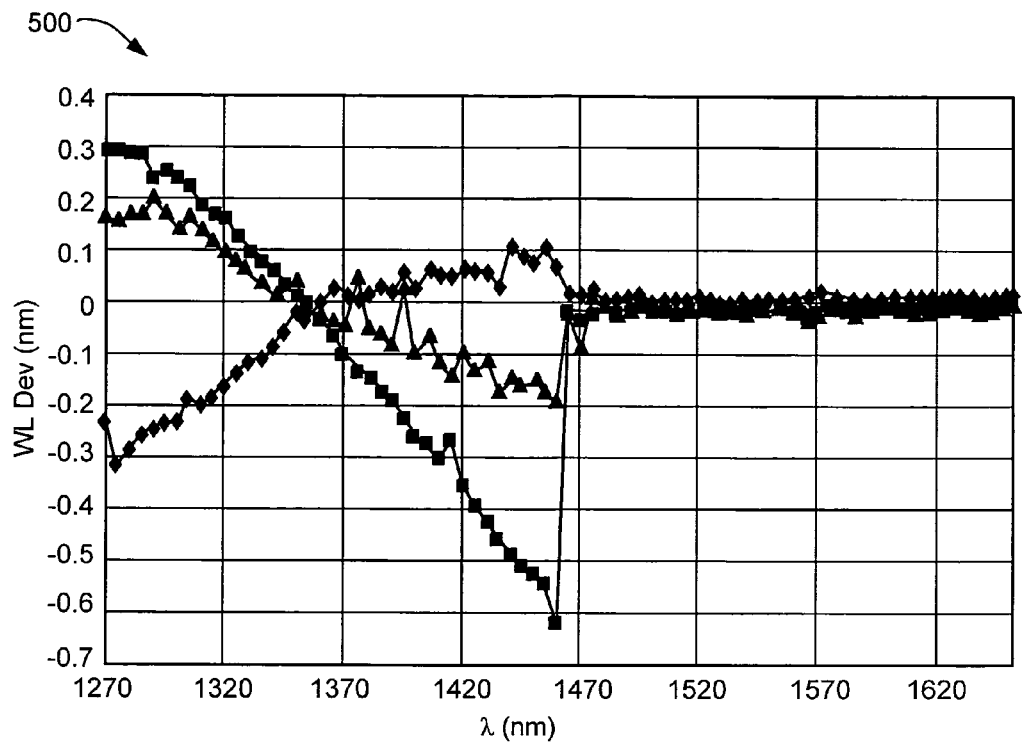
FIG. 5 is a graph of the wavelength accuracy of the wavelength measurement system without transferred wavelength reference information.

Referring now to FIG. 5, therein is shown a graph 500 that plots the wavelength accuracy ("WL Dev") of the wavelength measurement system 310. Shown is the wavelength accuracy for the O and E band region wavelength range of 1270 nm to 1460 nm when the unknown wavelength is calculated based on the signal's DAC circuit 204 reading only, without wavelength reference information transferred from the existing on-site wavelength reference setup for the 1460 nm to 1650 nm wavelength region. It shows wavelength accuracy of ± several hundreds of picometers to nanometers.

Figure 6:
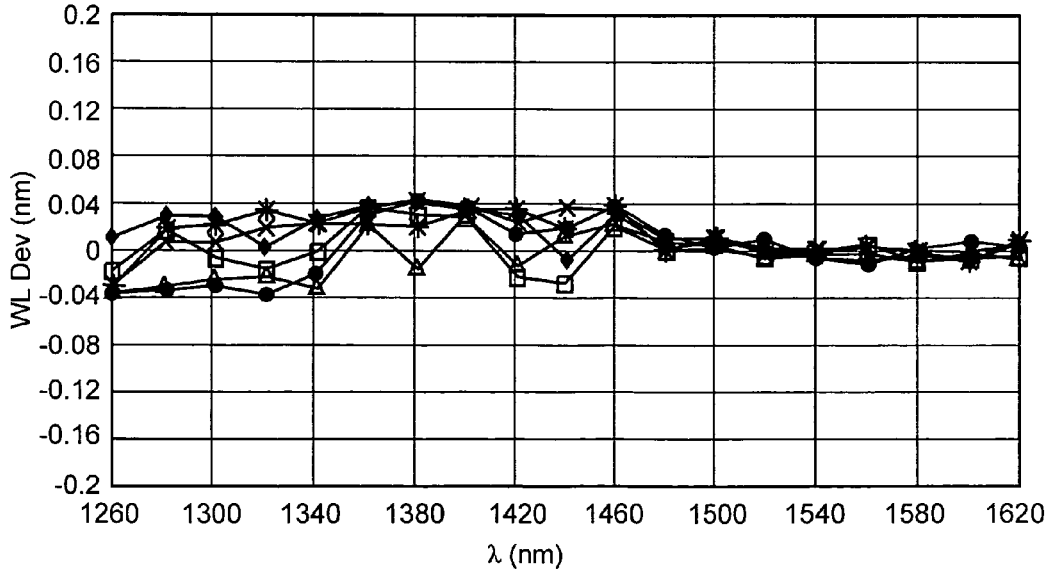
FIG. 6 is a graph of the wavelength accuracy of the wavelength measurement system with transferred wavelength reference information.

Conversely, and referring now to FIG. 6, therein is shown a graph 600 that plots the wavelength accuracy of the full band optical spectrum analyzer wavelength measurement system 310 of the present invention when the wavelength reference has been transferred from the S-C-L band region to the O and E band region as described above. In the transferred O and E band region 1270 nm to 1460 nm wavelength range, the wavelength accuracy is about ± 40.0 pm, which is very close to the wavelength accuracy in the S-C-L band region 1460 nm to 1650 nm range, e.g. ±30.0 pm. Comparison of the graph 600 to the graph 500 (FIG. 5) thus clearly demonstrates the successful inter-band transfer, according to the present invention, of the available (field) wavelength reference, and verifies the effectiveness and high wavelength accuracy of the present invention. It should be noted if the wavelength accuracy in the S-C-L band is further increased using another method in the future that in the O&E and other bands can also be improved accordingly.

Figure 7:
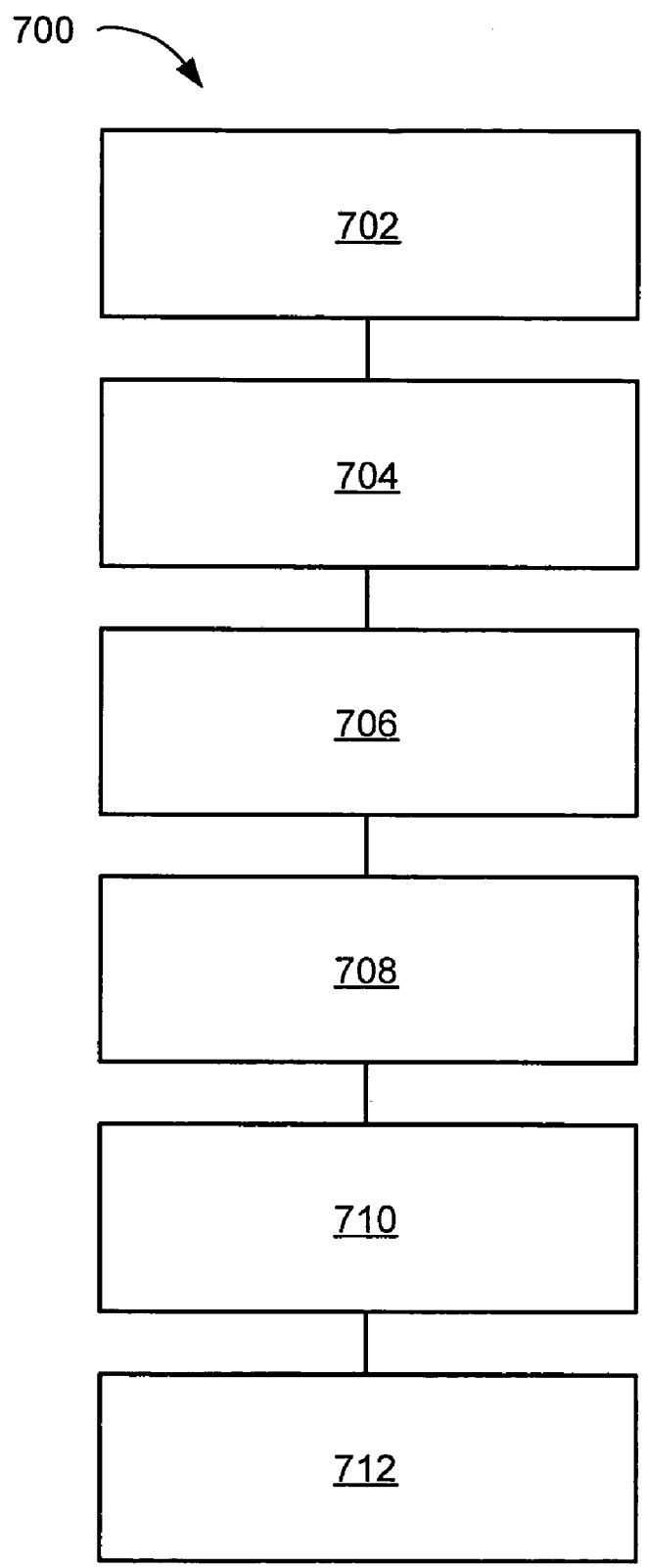
FIG. 7 is a flow chart of a system for optical spectrum analysis in accordance with an embodiment of the present invention.

Referring now to FIG. 7, therein is shown a flow chart of a wavelength measurement or monitoring system 700 in accordance with an embodiment of the present invention. The wavelength measurement or monitoring system 700 includes providing a tunable Fabry-Perot optical filter in a block 702; using at least one known light source to calibrate and correlate separate wavelength bands scanned by the tunable Fabry-Perot optical filter in a block 704; utilizing at least one wavelength reference to calibrate at least one wavelength band of the tunable Fabry-Perot optical filter in a block 706; transferring the wavelength reference to a wavelength band that is identified for measurement when the wavelength reference is not in a wavelength band identified for measurement by the tunable Fabry-Perot optical filter, in a block 708; scanning an unknown optical signal through the tunable Fabry-Perot optical filter in a block 710; and specifying the wavelengths in the unknown optical signal in a block 712.

It has been discovered that the present invention thus has numerous aspects.

Principally, the present invention provides wavelength measurement and monitoring systems that have broad wavelength ranges utilizing and benefiting from the particular advantages of FP interferometers.

Of equal or even greater importance and value is that the present invention provides related systems for broad- and inter-band multi-wavelength references.

An important aspect of the present invention is thus that it provides wavelength measurement and monitoring systems that employ a high precision and high accuracy FP interferometer for the measurement of wavelengths of light over broad and extended wavelength ranges.

Another aspect of the present invention is that it provides such broad and extended wavelength range wavelength measurement and monitoring systems that can utilize field-available reference and calibration sources that may not be in the wavelength band that is identified for measurement.

A particular aspect of the present invention is thus that it can accurately transfer a wavelength reference that is provided by an existing wavelength reference source to a different wavelength range of interest.

Yet another important aspect of the present invention is that it valuably supports and services the historical trend of reducing costs, simplifying systems, and increasing performance.

These and other valuable aspects of the present invention consequently further the state of the technology to at least the next level.

Thus, it has been discovered that the wavelength measurement system of the present invention furnishes important and heretofore unknown and unavailable solutions, capabilities, and functional advantages for optical spectrum analysis and the furnishing of broad- and inter-band multi-wavelength references. The resulting systems are straightforward, cost-effective, uncomplicated, highly versatile and effective, can be implemented by adapting known technologies, and are thus readily suited for efficiently and economically manufacturing and operating high performance wavelength measurement systems.

While the invention has been described in conjunction with a specific best mode, it is to be understood that many alternatives, modifications, and variations will be apparent to those skilled in the art in light of the aforegoing description. Accordingly, it is intended to embrace all such alternatives, modifications, and variations, which fall within the scope of the included claims. All matters hithertofore set forth herein or shown in the accompanying drawings are to be interpreted in an illustrative and non-limiting sense.

The invention claimed is:

1. A wavelength measurement or monitoring system, comprising:
   providing a tunable Fabry-Perot optical filter;
   using at least one known light source to calibrate and correlate separate wavelength bands scanned by the tunable Fabry-Perot optical filter;
   utilizing at least one wavelength reference to calibrate at least one wavelength band of the tunable Fabry-Perot optical filter including simultaneously coupling the outputs of first and second lasers to a wavelength meter and to the tunable Fabry-Perot optical filter;
   transferring the wavelength reference to a wavelength band that is identified for measurement when the wavelength reference is not in a wavelength band identified for measurement by the tunable Fabry-Perot optical filter;
   scanning an unknown optical signal through the tunable Fabry-Perot optical filter; and
   specifying a wavelength in the unknown optical signal.

2. The method of claim 1 wherein providing a tunable Fabry-Perot optical filter further comprises providing a single Fabry-Perot optical filter.

3. The method of claim 1 further comprising:
   providing a calibration-mapping table,
   providing a dynamic mapping table, and
   providing a dynamic offset table.

4. The method of claim 1 wherein providing a tunable Fabry-Perot optical filter further comprises providing a tunable Fabry-Perot optical filter configured for scanning a range of wavelengths at least from substantially 1260 nm to substantially 1640 nm.

5. A wavelength measurement or monitoring system, method comprising:
   providing a tunable Fabry-Perot optical filter configured for:
      scanning a multiple wavelength range with a total scanning range that is larger than the free spectrum range of the tunable Fabry-Perot optical filter; and
      individually detecting separate multiple optical orders of the wavelengths scanned and filtered by the tunable Fabry-Perot optical filter;
   using at least one known tunable light source to calibrate and correlate the separate multiple optical orders of the wavelengths scanned by the tunable Fabry-Perot optical filter including simultaneously coupling the outputs of and second lasers to a wavelength meter and to the tunable Fabry-Perot optical filter;
   utilizing at least one field-available wavelength reference and calibration source, that may not be in a wavelength band that is identified for measurement, to calibrate at least one wavelength band of the tunable Fabry-Perot optical filter prior to measuring a light source in a wavelength band that is identified for measurement;
   transferring the wavelength reference to a wavelength band that is identified for measurement when the wavelength reference and calibration source is not in a wavelength band identified for measurement by the tunable Fabry-Perot optical filter, to enable the provision of broad- and inter-band multi-wavelength references;
   scanning an unknown optical signal through the tunable Fabry-Perot optical filter; and
   specifying the exact wavelengths in the unknown optical signal.

6. The method of claim 5 wherein providing a tunable Fabry-Perot optical filter further comprises providing a single Fabry-Perot optical filter for the measurement of wavelengths of light over broad and extended wavelength ranges.

7. The method of claim 5 further comprising:
   providing a calibration-mapping table,
   providing a dynamic mapping table, and
   providing a dynamic offset table.

8. The method of claim 5 wherein providing a tunable Fabry-Perot optical filter configured for scanning a wavelength range that is larger than the free spectrum range of the tunable Fabry-Perot optical filter further comprises providing a single, tunable Fabry-Perot optical filter configured for scanning a range of wavelengths at least from substantially 1260 nm to substantially 1640 nm.

9. A wavelength measurement or monitoring system, comprising:
   a tunable Fabry-Perot optical filter;
   the wavelength bands scanned by the tunable Fabry-Perot optical filter having the characteristics of having been calibrated and correlated by at least one known light source;
   control circuitry for utilizing at least one wavelength reference to calibrate at least one wavelength band of the tunable Fabry-Perot optical filter includes:
      a wavelength meter; and
      first and second lasers having outputs simultaneously coupled to the Wavelength meter and the tunable Fabry-Perot optical filter;
   circuitry for transferring the wavelength reference to a wavelength band that is identified for measurement when the wavelength reference is not in a wavelength band identified for measurement by the tunable Fabry-Perot optical filter;
   circuitry for controlling scanning of an unknown optical signal through the tunable Fabry-Perot optical filter; and
   circuitry for specifying a wavelength in the unknown optical signal.

10. The system of claim 9 wherein the tunable Fabry-Perot optical filter further comprises a single Fabry-Perot optical filter.

11. The system of claim 9 further comprising:
    a calibration-mapping table,
    a dynamic mapping table, and
    a dynamic offset table.

12. The system of claim 9 wherein the tunable Fabry-Perot optical filter further comprises a tunable Fabry-Perot optical filter configured for scanning a range of wavelengths at least from substantially 1260 nm to substantially 1640 nm.

13. The system of claim 9 wherein:
    the known light source further comprises a tunable light source;
    the wavelength reference further comprises a field-available wavelength reference and calibration source that may not be in a wavelength band that is identified for measurement;
    the control circuitry for utilizing at least one wavelength reference further comprises control circuitry configured to calibrate at least one wavelength band of the tunable Fabry-Perot optical filter prior to measuring a light source in a wavelength band that is identified for measurement;

the circuitry for transferring the wavelength reference to a wavelength band that is identified for measurement further comprises circuitry for transferring the wavelength reference to enable the provision of broad- and inter-band multi-wavelength references; and the circuitry for specifying a wavelength in the unknown optical signal further comprises circuitry for specifying the exact wavelengths in the unknown optical signal.

14. The system of claim 13 wherein the tunable Fabry-Perot optical filter further comprises a single Fabry-Perot optical filter for the measurement of wavelengths of light over broad and extended wavelength ranges.

15. The system of claim 13 further comprising:
a calibration-mapping table,
a dynamic mapping table, and
a dynamic offset table.

16. The system of claim 13 wherein the tunable optical filter further comprises a single, tunable Fabry-Perot optical filter configured for scanning a range of wavelengths at least from substantially 1260 nm to substantially 1640 nm.

* * * * *